United States Patent [19]

Bauman

[11] Patent Number: 4,573,113
[45] Date of Patent: Feb. 25, 1986

[54] SURGE PROTECTION SYSTEM FOR A D-C POWER SUPPLY DURING POWER-UP

[75] Inventor: Bruce K. Bauman, Glen Rock, Pa.

[73] Assignee: Borg-Warner Corporation, Chicago, Ill.

[21] Appl. No.: 574,301

[22] Filed: Jan. 26, 1984

[51] Int. Cl.$^4$ ............................................. H02M 7/06
[52] U.S. Cl. ...................................... 363/48; 363/37; 363/49; 363/53
[58] Field of Search ................................... 363/47–49, 363/37, 45, 53

[56] References Cited

U.S. PATENT DOCUMENTS

| | | | |
|---|---|---|---|
| 3,631,332 | 12/1971 | Williamson | 363/49 |
| 3,824,441 | 7/1974 | Heyman et al. | 363/37 |
| 4,409,647 | 10/1983 | Terkanian | 363/37 |

FOREIGN PATENT DOCUMENTS

| | | | |
|---|---|---|---|
| 1049446 | 1/1959 | Fed. Rep. of Germany | 363/48 |
| 1090305 | 10/1960 | Fed. Rep. of Germany | 363/48 |
| 94969 | 7/1981 | Japan | 363/49 |
| 92015 | 6/1983 | Japan | 363/49 |

Primary Examiner—William H. Beha, Jr.
Attorney, Agent, or Firm—James E. Tracy

[57] ABSTRACT

Surge protection is provided for a d-c power supply, wherein rectified a-c line voltage is filtered in an LC filter having a shunt-connected filter capacitor, by inserting a limiting resistor in series with the filter capacitor during power-up to reduce the inrush current and the voltage overshoot to acceptable values. Once the power-up period is over and d-c power is fed to a load, the limiting resistor is bypassed.

1 Claim, 1 Drawing Figure

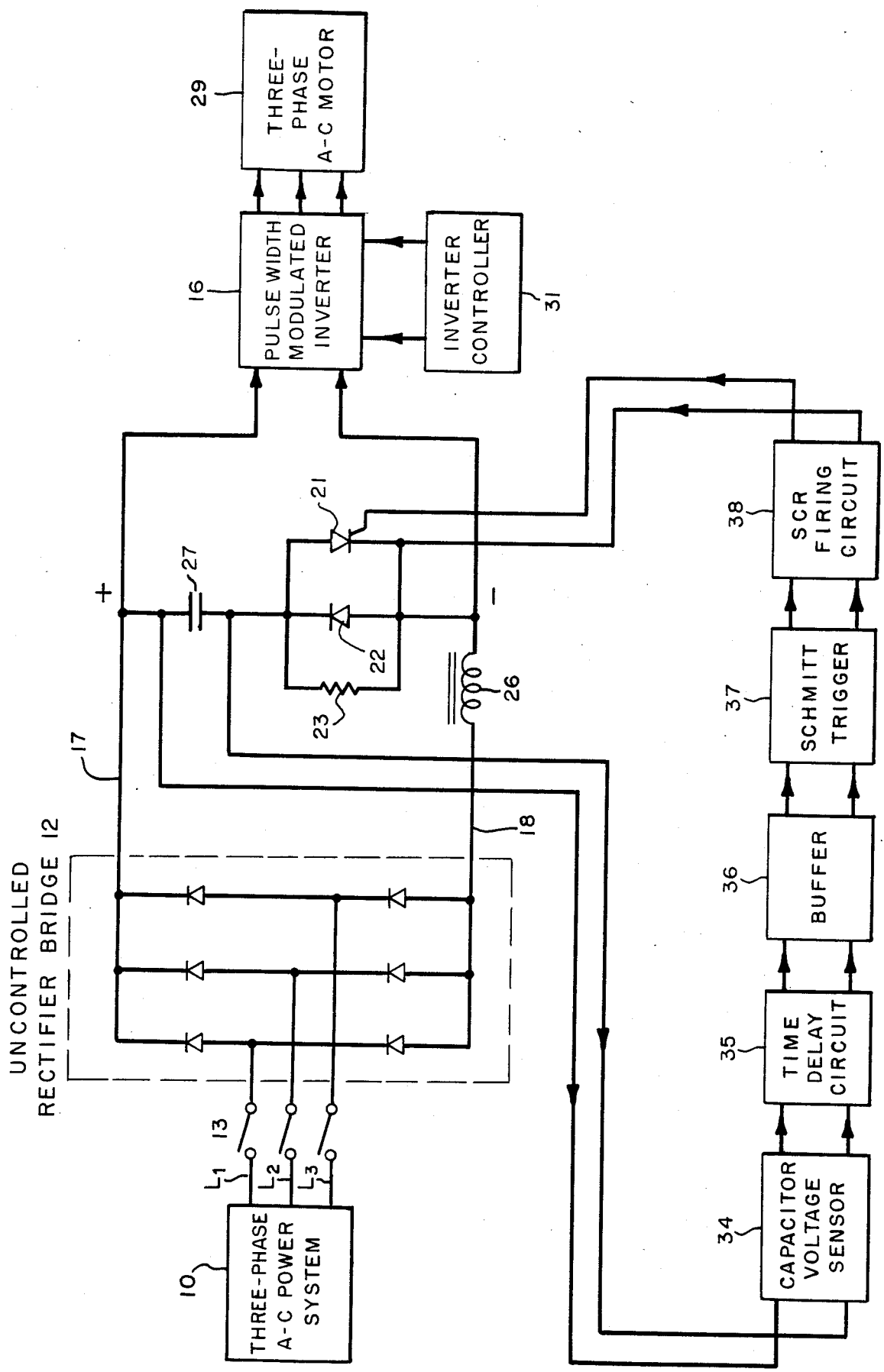

SURGE PROTECTION SYSTEM FOR A D-C POWER SUPPLY DURING POWER-UP

BACKGROUND OF THE INVENTION

This invention relates to a surge protection system for reducing, during power-up, inrush current and overshoot voltage in a shunt-connected filter capacitor at the output of a rectifier which rectifies a-c power line voltage.

With the development of high power solid state devices, large power converters employing rectifier-filter arrangements have become quite common. More particularly, with the improvements made in pulse width modulated inverters and switching power supply techniques, uncontrolled rectifier bridges feeding low pass LC filters are commonly used in large A-C to D-C to A-C power converters. There are two problems, however, when an uncontrolled rectifier bridge, followed by an LC filter, are initially connected to an a-c power distribution system to receive a-c line voltage. The first problem during this power-up period is that the peak current drawn from the a-c power system for the first several line cycles may be large enough to cause fuses and/or circuit breakers in the a-c power system to open. The second problem encountered is the overshoot in the d-c voltage across the shunt-connected filter capacitor. Both of these problems result from the transient response characteristic of the LC filter circuit. A reasonable approximation for the magnitudes of the peak of the current inrush and the amount of the voltage overshoot can be obtained by assuming that the dormant LC filter network is excited by a step of voltage equal to the peak of the a-c voltage on the power distribution system.

Unless the inrush current and the overshoot voltage in the filter capacitor are reduced or limited, in addition to the actuation of the fuses and/or circuit breakers in the a-c power distribution system, the rectifying devices in the rectifier bridge, the filter capacitor itself, and circuit components in the load which is connected to the filter network could be damaged or destroyed. Surge protection systems have been developed in the past to limit the inrush current and overshoot voltage.

In one such prior system, a limiting resistor is inserted in series with each of the power lines, three resistors thereby being required in a three-phase a-c power system. After power-up, a multi-pole contactor is closed to bypass each of the resistors for normal operation, thereby avoiding an undesired power loss and voltage drop. A major disadvantage of this prior system is the number of resistors required to accomplish the limiting. Moreover, the contacts of the shunting contactor must be rated to carry full rated a-c line current.

In another prior system a single limiting resistor, bypassed by a shunting switch, is located on the d-c side of a rectifier bridge. After power-up, the switch is closed and must therefore be sized to conduct the full d-c load current. This is a demanding application for a switch or contactor since the normal d-c load current in a large power converter can be very high.

The surge protection system of the present invention is a substantial improvement over those previously developed. Not only is it of relatively simple construction, but it is significantly less expensive than the prior surge protection systems.

SUMMARY OF THE INVENTION

The invention provides a surge protection system for a d-c power supply wherein a-c line voltage, received from an a-c power distribution system, is rectified in an uncontrolled rectifier bridge to develop a d-c voltage which is then filtered and smoothed in a low pass LC filter having a series-connected filter inductor and a shunt-connected filter capacitor. The surge protection system comprises a resistance, connected in series with the filter capacitor, for limiting the inrush current flowing to the capacitor and the overshoot voltage produced across the capacitor during the power-up period. Control means are provided for essentially bypassing, or shorting out, the resistance at the conclusion of the power-up or inrush period.

DESCRIPTION OF THE DRAWING

The features of the invention which are believed to be novel are set forth with particularity in the appended claims. The invention may best be understood, however, by reference to the following description in conjunction with the accompanying drawing which schematically illustrates an a-c line voltage energized d-c power supply which in turn drives an inverter-motor load, the d-c power supply having a surge protection system constructed in accordance with one embodiment of the invention.

DESCRIPTION OF THE ILLUSTRATED EMBODIMENT

Referring to the drawing, three-phase a-c line voltage is received over line conductors $L_1$, $L_2$ and $L_3$ from a conventional three-phase a-c power distribution system 10, the magnitude of the line voltage taking any appropriate value depending on the characteristics of the load to be driven. For example, in a 50 horsepower inverter drive the a-c line voltage will probably have a magnitude of around 460 volts. Of course, power source 10 need not be three-phase. It can be any multi-phase a-c power supply, or even a single phase source.

Line conductors $L_1$, $L_2$ and $L_3$ connect to a rectifier bridge 12 by means of normally-open main disconnect switch 13. Since the inverter 16 employed in the illustrated power conversion system is of the pulse width modulated type, rectifier bridge 12 need not be controlled and may thus comprise six rectifier diodes, connected in conventional fashion, for rectifying the three-phase a-c line voltage to produce a d-c voltage of fixed amplitude across conductors 17 and 18, the voltage being of positive polarity on conductor 17 with respect to conductor 18.

In a manner to be explained, during normal running operation silicon controlled rectifier (SCR) 21 and oppositely-poled shunting diode 22 will conduct to essentially short out resistor 23. Hence, during that time series-connected inductor 26 and shunt-connected capacitor 27 will be coupled to the output of uncontrolled rectifier bridge 12 in conventional manner to form a low pass LC filter to filter and smooth the d-c voltage across conductors 17 and 18. Although only a single filter capacitor 27 is illustrated in the drawing, in actual practice in a large inverter drive (such as 50 horsepower) a bank of series and parallel capacitors would probably be employed to obtain the required capacitance and voltage rating. A filtered d-c voltage of constant magnitude will thus be applied to pulse width modulated inverter 16, which may be of well-known construction in order to convert the d-c voltage to three-phase alternating voltage for application to three-phase a-c motor 29.

In brief, inverter 16 will comprise a series of switching devices that are turned on and off in the correct sequence and at the correct times, by triggering pulses from inverter controller 31, to convert the fixed amplitude d-c voltage to a-c voltage as applied to the windings of motor 29, thereby delivering alternating current to the windings to effect rotation of the motor at a speed determined by and directly proportional to the frequency of the inverter output a-c voltage. Hence, controller 31 determines the motor speed. A manual adjustment may be included to affect the operation of the controller, or it may be controlled in response to some sensed parameter or characteristic of the system, in which the disclosed inverter drive is incorporated, in order to automatically control the motor speed in accordance with the sensed information.

The construction of inverter controller 31 is, of course, well-known to those skilled in the art. The triggering pulses produced by controller 31 are appropriately programmed to control the duty cycles of the switching devices in the inverter so that the amplitude of the a-c voltage applied to the motor will be changed when the frequency of that a-c voltage is varied. Preferably, the switching devices in inverter 16 are controlled by controller 31 to maintain a substantially constant ratio of amplitude to frequency of the inverter output voltage. By maintaining a fixed ratio of the amplitude of the inverter output voltage relative to its frequency, overheating of motor 29 will be avoided and the motor will be provided with a constant torque output capability regardless of motor speed.

Turning now to the invention, when the inverter drive is inoperative and disconnect switch 13 is open, filter capacitor 27 will be fully discharged. When switch 13 is then closed to power-up the inverter drive, a surge of current will tend to flow through the rectifiers in bridge 12 and into capacitor 27 (in the direction from out of conductor 17 and into conductor 18) which at this time is essentially a short circuit. However, at power-up SCR 21 will be turned off so the surge or inrush current will be forced to flow through series limiting impedance or resistor 23 which limits that surge current and any voltage overshoot on the capacitor to acceptable values that will not open any circuit breakers or fuses or damage any elements in the inverter drive.

After the power-up or inrush period is over, limiting resistor 23 should be shunted or bypassed to avoid a power loss and voltage drop. This is accomplished by capacitor voltage sensor 34 which senses the voltage across filter capacitor 27 and produces a reduced-amplitude or scaleddown replica of that capacitor voltage. Preferably, this is achieved by initially reducing the capacitor voltage with a voltage dividing arrangement and then applying the reduced voltage to the input of a differential amplifier, the output of which thereby rises as the capacitor voltage builds up during the power-up period.

Since the increasing output signal from sensor 34 indicates the charge condition of capacitor 27, that signal could be used directly to control the operation of SCR 21. However, to ensure that the SCR is not fired into conduction until capacitor 27 is fully charged and the inrush period is concluded, the signal from sensor 34 is subjected in circuit 35 to a slight time delay, for example, around 60 milliseconds in a 50 horsepower inverter drive. Time delay circuit 35 may be implemented by a simple RC circuit consisting of a series resistor and a shunt capacitor. A time delay is desired because of the tolerances in the sensing circuitry components and variations in the input a-c line voltage which make it difficult to determine precisely, from the output signal of the differential amplifier in sensor 34, when it is safe to fire SCR 21. Buffer 36 is included to prevent the following circuitry from loading down the time delay circuit 35.

The output signal of the buffer stage is fed to a Schmitt trigger 37 which switches from a relatively low to a relatively high amplitude output when the buffer output signal reaches a preset threshold level, which level indicates that the filter capacitor 27 is fully charged and that the power-up period is concluded. When the Schmitt trigger circuit switches from low to high, SCR firing circuit 38 is operated to supply gate current to SCR 21 to turn the SCR on. Preferably, circuit 38 comprises a Darlington transistor which is maintained off as long as Schmitt trigger 37 is in its low output state. A high output from the Schmitt trigger renders the Darlington transistor conductive which in turn causes gate current to flow into the gate of SCR 21, as a result of which the SCR turns on.

Thus, after the power-up period and when SCR 21 is switched on, resistor 23 is essentially bypassed or short circuited and the LC filter functions in normal fashion. Because the current in the filter capacitor 27 is a-c in nature during normal operation, gate current will be maintained in SCR 21. This allows the SCR to turn on whenever it is required to conduct filter capacitor current. The diode 22 is antiparallel with, or oppositely-poled relative to, SCR 21 in order to provide a current path for the filter capacitor current when the current flows in a direction opposite to that which the SCR can carry.

It will be appreciated that the major advantage of locating a single limiting resistor in the capacitor leg of the LC filter, as in the present invention, is that the shunting device (SCR 21 in combination with diode 22) must only be rated to handle the full ripple current in the filter capacitor. This value is typically less than one-half the value of current in each input line to the rectifier bridge or in the main conductors (like conductors 17 and 18) from the bridge. For example, in a 50 horsepower inverter the main d-c current flowing through conductors 17 and 18 to the inverter-motor system is about 70 amps, while the capacitor current is only about 30 amps.

Also to be noted is that resistor 23 will always be bypassed, after power-up, as long as switch 13 remains closed. This condition prevails whether motor 29 is running or not. Thus, no power is wasted in resistor 23 when the motor is not in its run condition.

It is also to be understood that the present invention may be practiced without a low pass filter of the LC type. The filter may comprise merely a shunt-connected capacitor.

Obviously, the invention is susceptible to many variations. For example, switching device 21 need not be an SCR but could take the form of a relay switch, contactor or transistor. Moreover, the firing time of SCR 21 could be determined by sensing some other parameter than the filter capacitor voltage. For instance, the voltage across limiting resistor 23 can be sensed. Since this voltage is directly proportional to the magnitude of the inrush current, it could be used without a time delay to determine when the inrush period is over even in the presence of a-c line voltage variations.

The invention provides, therefore, a relatively simple and inexpensive surge protection system for limiting the peak current drawn from an a-c power distribution system when power is first applied to a circuit comprising an uncontrolled rectifier and a low pass fillter.

While a particular embodiment of the invention has been shown and described, modifications may be made, and it is intended in the appended claims to cover all such modifications as may fall within the true spirit and scope of the invention.

I claim:

1. A surge protection system for a d-c power supply wherein a-c line voltage, received from an a-c power distribution system, is rectified in an uncontrolled rectifier bridge to develop a d-c voltage which is then filtered and smoothed in a low pass filter having a series-connected filter inductor and a shunt-connected filter capacitor, said surge protection system comprising:

a resistance, connected in series with the filter capacitor, for limiting the inrush current flowing to the capacitor and the overshoot voltage produced across the capacitor during the power-up period;

and control means for essentially bypassing said resistance at the conclusion of the power-up period and including a sensor for sensing the filter capacitor voltage and producing a scaled-down replica of that voltage, a time delay circuit for delaying the replica voltage, and a triggering circuit for turning on a solid state switch to short out said resistance when the replica voltage reaches a preset level, which level indicates that the filter capacitor is fully charged and that the power-up period is concluded.

* * * * *